Dec. 5, 1961 G. C. STOUT 3,011,777
RETRACTABLE STRUT
Filed Nov. 6, 1957 3 Sheets-Sheet 2

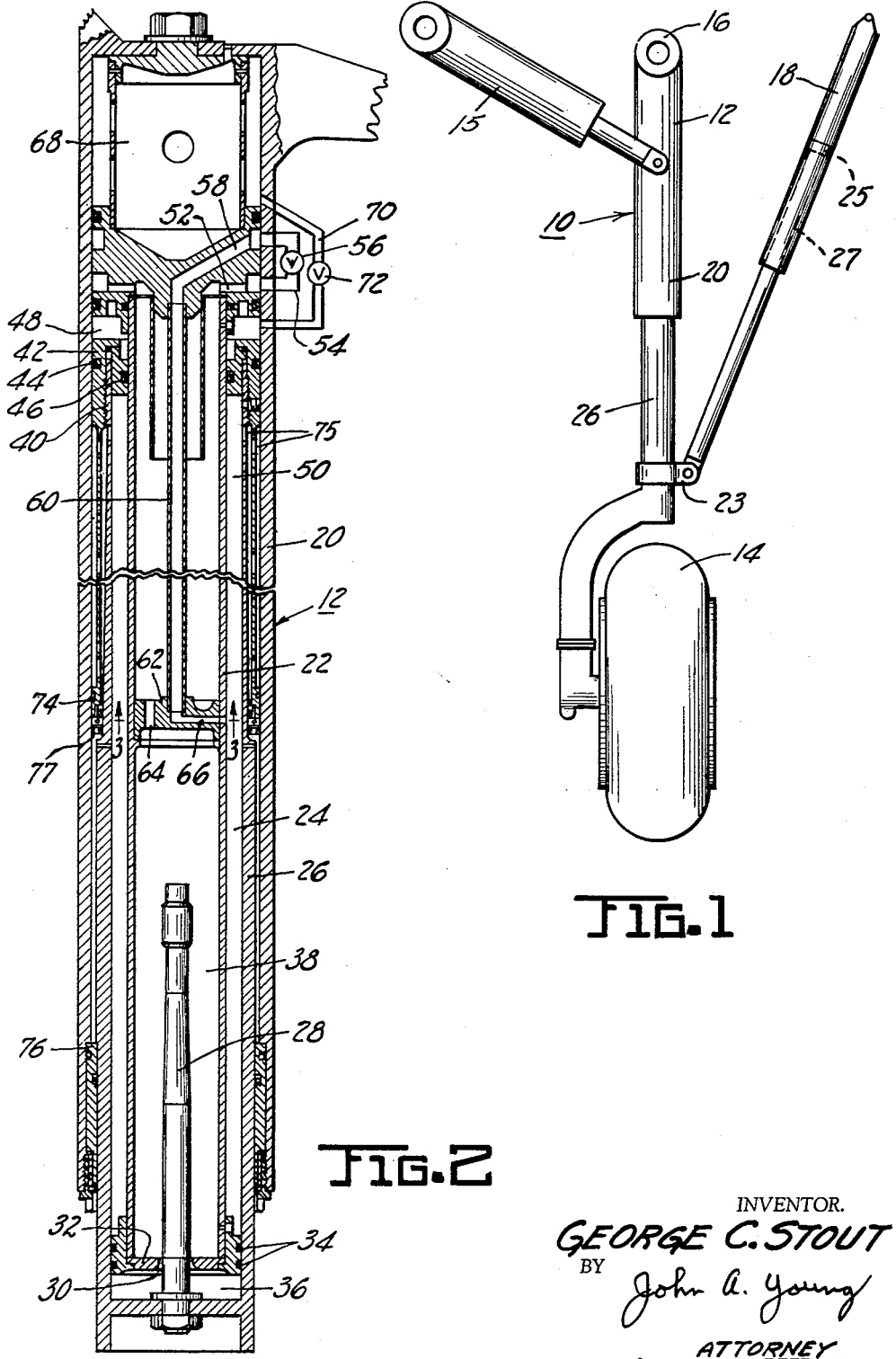

INVENTOR.
GEORGE C. STOUT
BY John A. Young
ATTORNEY

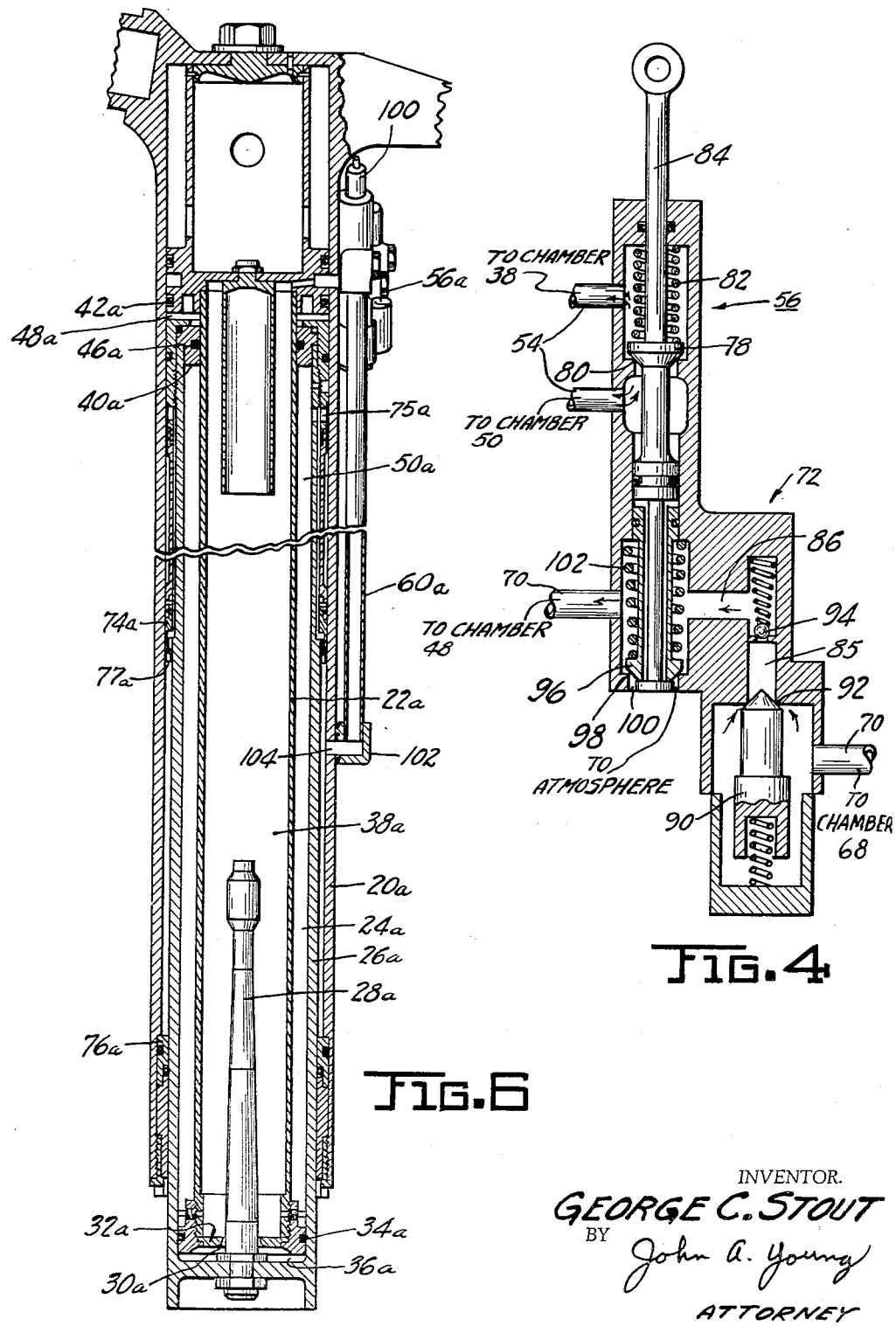

3,011,777
RETRACTABLE STRUT
George C. Stout, South Bend, Ind., assignor to The Bendix Corporation, a corporation of Delaware
Filed Nov. 6, 1957, Ser. No. 694,794
6 Claims. (Cl. 267—64)

This invention relates to a retractable strut which is a part of an aircraft undercarriage.

During retraction of the strut into what is sometimes known in the art as a "wheel well," it is often desirable to shrink or contract the strut to a minimum length as a space saving measure. With the strut contracted, it will occupy considerably less space and this is an important consideration in modern commercial and military aircraft.

It is one of the objects of the present invention to control the resistance of the strut to shrinkage during the process of retraction so that less power is required of the retracting mechanism and smaller structural parts can be provided for this purpose. Also involved is a safety consideration. In the present invention, less energy is stored in the strut in its contracted state so that the strut is potentially less dangerous since it is less likely to elongate accidentally while it is retracted within the wheel well.

Another object of the invention is to provide by uncomplicated structural means, an arrangement by which the strut will be caused to reduce in its resistance to contraction responsively to the process of strut retraction. The structure proposed is intended to function in a very simple and reliable manner so as to reduce the likelihood of malfunctioning.

Also forming a part of the present invention is that within a strut having the features described, it is also possible to selectively control the stiffness of the strut in its lowered or down position so that the aircraft can land with heavier loads. The added stiffness of the strut will also aid in catapult take-off to maintain the aircraft in a correct attitude in spite of the high orders of vertical loads which are imposed on the aircraft, tending to depress the aircraft on the strut. This selection of the stiffness of the strut is fully controllable so the strut can be relieved of this extra stiffness.

Other objects and features of the invention will become apparent from a detailed consideration of the following description, which proceeds with reference to the accompanying drawings, wherein a plurality of embodiments of the invention are illustrated by way of example.

In the drawings:

FIGURE 1 is a front elevation view of the strut showing the retracting mechanism and shrinkage means for contracting the strut;

FIGURE 2 is a section view taken through the telescoping portion of the strut, the strut being shown in the fully retracted or collapsed position;

FIGURE 4 is a sectional view of the control valve for determining the stiffness of the strut, and reducing the stiffness of the strut to permit ease of action thereof;

Figure 5:
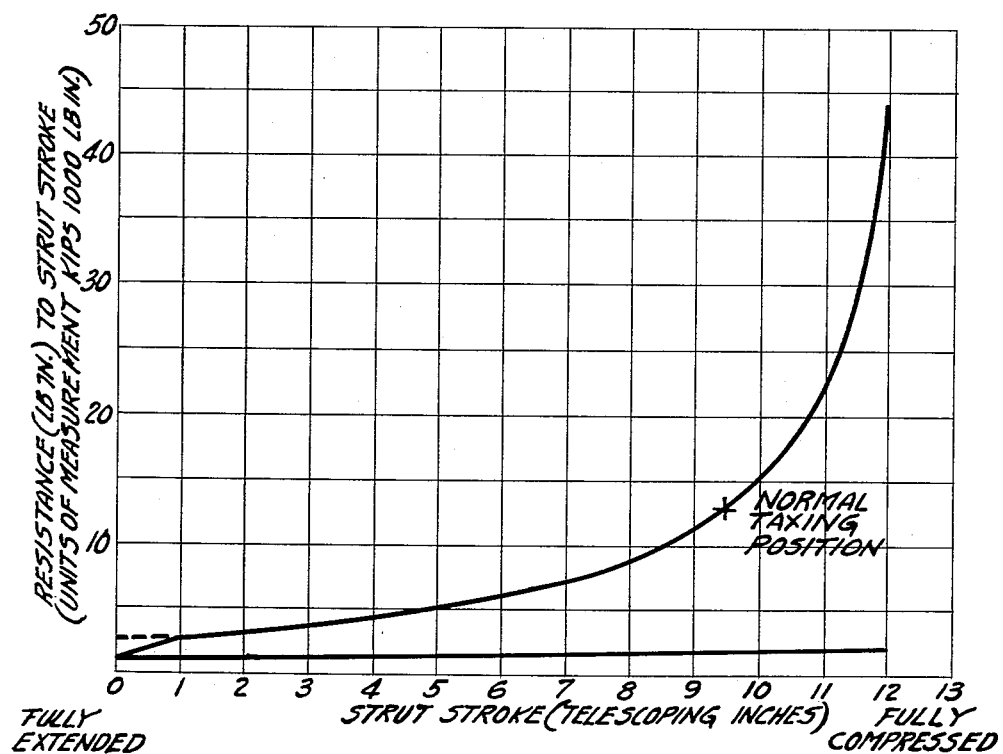
FIGURE 5 is a chart showing Pressure v. Strut Stroke indicating the performance characteristics of the strut; and, FIGURE 6 is a section view through the length of another strut, illustrating a second embodiment of the invention.

A strut of the type shown in the drawings is known as an "oleo" type strut in which both oil and air are used to cushion the aircraft. The impact of landing is absorbed by the resistance to passage of oil through an orifice, the effective size of which is determined by a metering pin, and, thereafter, the aircraft is cushioned primarily by compressed air medium. After initial impact following touch down of the wheels, the weight of the aircraft is gradually transferred to a pneumatic pressure cushion within the strut which absorbs the shock of taxiing and general ground handling. The "air" can be any gaseous material—helium, nitrogen, etc.

Referring now to FIGURES 1 and 2, the aircraft undercarriage designated generally by reference numeral 10 consists of a strut 12 which carries a ground engaging wheel 14 at the one end thereof. A retracting mechanism 15 pivots the strut about a trunnion 16, causing turning of the strut clockwise (FIGURE 1) to draw the strut upwardly, and a shrink link 18 simultaneously contracts or telescopes the strut with retraction thereof.

Referring next to FIGURE 2, the strut 12 comprises an outer 20 and an inner 22 concentric tubular members which are relatively fixed and nonreciprocable. Between the inner and outer tubular members 20 and 22 and within the annular space 24 therebetween, there is a relatively reciprocable telescoping tubular member 26 which carries a metering pin 28 which serves to control the effective cross sectional area of an orifice 30 in a diaphragm 32 located at the end of inner relatively fixed tubular member 22. Diaphragm 32 has annular O ring seals 34 or the like which constrain the passage of fluid across the diaphragm to the effective cross sectional area of the orifice 30 as determined by the metering pin 28. Thus, during landing, hydraulic fluid is transferred from chamber 36 below the diaphragm 32 to the chamber 38 which is the interior of the tubular member 22.

At the end 40 of tubular member 26, is a piston 42 sealed at the outer and inner peripheries with O ring seals 44 and 46, respectively. The piston slidably engages the adjacent surfaces of the concentric tubular members 20 and 22. The piston 42 separates the annular space 24 into two variable volume chambers 48 and 50, the chamber 50, as illustrated in FIGURE 2, comprises the space between outer 20 and inner 22 concentric tubular members below piston 42, this includes the space on both side of reciprocable tubular member 26 and the extension for stop 74, the various portions of chamber 50 being interconnected through ports 75.

Figure 3:
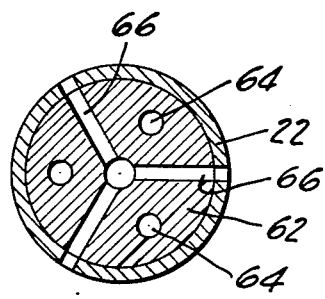
FIGURE 3 is a detail view of the partition located in the end of the one of the concentric relatively fixed tubular members.

A passage 52 leads from chamber 38 and connects with conduit 54 having a valve 56 which is shown schematically in FIGURE 2. The conduit 54 in turn connects with a second passage 58 which leads to a conduit 60 extending within the chamber 38 and along the length of the strut. Conduit 60 is joined with a partition 62 (see FIGURE 3) having openings 64 which permit passage of oil and air thereacross within the chamber 38 and has a number of radial passages 66 which open into the variable volume chamber 50. The conduit 60 communicates with radial passages 66. As shown in FIGURE 3, the perforations 64 and passages 66 do not intersect.

Also, within the strut is a reservoir 68 which is charged with considerable pressure, probably in the range of 3000 p.s.i. The reservoir 68 is communicable with variable volume chamber 48 through line 70 which is controlled by valve 72 shown schematically in FIGURE 2.

Extension of the strut is limited by engagement of a stop 74 which is operatively secured to tubular member 26, with a fixed abutment 76 which is secured to the outer tubular member 20. A snubber 77 is combined with the stop 74 so that just prior to engagement of stop 74 with abutment 76 the extension of the strut will be snubbed, thus reducing the force of engagement therebetween. This snubbing action forms no part of the present invention.

Valves 56 and 72 which are shown schematically in FIGURE 2 are shown in greater detail in FIGURE 4.

Communication between chambers 38 and 50 is controlled by valve 56 which is comprised of a movable valve member 78 bearing on valve seat 80 and loaded by spring 82. When the movable valve member 78 is seated, communication between chambers 38 and 50 is prevented. When the movable valve member 78 is unseated by movement of the valve stem 84 upwards, then chambers 38 and 50 are communicated as shown by the arrows. The valve 72 (of FIGURE 4) is connected to chambers 48 and 68 (FIGURE 2) by conduit 70 and is comprised of passages 85 and 86; a solenoid valve member 90, electrical actuation of the solenoid controlled manually in any well known manner, operative with valve seat 92 to control fluid communication from conduit 70 to passage 85; a check valve member 94 operative to permit the passage of air only from chamber 68 to chamber 48; and a valve member 96 operative with seat 98 to vent chamber 48 to the atmosphere through port 100 when open. When solenoid valve member 90 is operated to unseat said valve member from seat 92, pressure from chamber 68 inflates chamber 48. Valve member 96 is urged in a normally closed position by spring 102 and is moved to an open position by upward movement of valve stem 84.

It should be noted that valve members 78 and 96 are synchronized so that simultaneously with venting of pressure from chamber 48 to atmosphere, the chambers 38 and 50 are simultaneously communicated.

*Operation*

There are different stages of operation which will be described for an understanding of the invention; namely, take-off, strut retraction (accompanied by strut contraction), strut lowering (accompanied by strut expansion), and aircraft landing and taxiing.

(1) *Take-off.*—Assuming that the aircraft is launched by catapult, the catapult imposes very high orders of force from the aircraft onto the nose wheel strut, which tends to depress the nose of the aircraft downwardly if the stiffness of the strut is insufficient. It is important, of course, to maintain the proper attitude of the aircraft and for this reason the strut must be stiffened to prevent the aircraft from nosing down by collapse of the nose strut. Preliminary to take-off, the solenoid valve 90 is operated to communicate reservoir 68 with variable volume chamber 48. This inflates the pressure in chamber 48 with the same pressure as in chamber 68. The inflation pressure in 48 acts over the area defined by the inner and outer diameters of O ring seals 44 and 46 to give the strut additional rigidity or stiffness and prevents the catapulting force from nosing down the aircraft.

After the plane is launched and becomes airborne, assume that the pilot must land immediately owing to some emergency. Obviously, when the aircraft is first launched, it has an appreciable load of fuel and cargo. So that the strut can withstand this additional load during emergency landing, the chamber 48 is maintained at its pneumatic charge determined from reservoir 68. The higher pressure of inflation in chamber 48 gives the strut an extra stiffness enabling the strut to withstand impact of landing under full load, without the strut "bottoming out," that is, contracting to the point where stop 74 engages abutment 76.

(2) *Strut retraction.*—Following take-off, the landing gear is normally retracted to reduce wind resistance.

The retracting mechanism 15 is actuated to pivot the strut about trunnion 16 and draw it upwardly into a wheel well which is provided therefor. When the retracting mechanism is operated, the strut is rotated clockwise about the trunnion 16 and as it is rotated, the shrink linkage 18 which is connected to the bottom portion of the telescoping tubular member 22 by a collar 23, draws a piston 25 along the length of the shrink link and acts against a closed air chamber 27, thus developing sufficient force on the telescoping member 22 to produce a shrinkage of the strut.

As the strut is thus caused to shrink or telescope, the pneumatic pressure in chamber 48 increases to resist strut shrinkage, this resistance being indicated in the chart, FIGURE 5. As the strut nears complete shrinkage, the order of pressures in chamber 48 becomes exceedingly high and would demand considerable structural strength from both the retracting mechanism and the shrink link. To prevent this occurrence, the valve stem 84 is actuated responsively to strut movement so that when the landing gear is first caused to turn from its initial angular position shown in FIGURE 1, the valve members 78 and 96 are unseated thereby venting the inflated pressure from chamber 48 to atmosphere and intercommunicating chambers 38 and 50. This may be accomplished by connecting valve stem 84 through a suitable linkage (not shown) to the aircraft.

Thus as the strut is caused to contract, and oil from chamber 36 is passed into chamber 38 to reduce the volume thereof, the air in chamber 38 is vented into the expanding variable volume chamber 50 which increases in volume as the capacity of chamber 38 is caused to decrease.

The strut is collapsed relatively slowly during retraction so substantially no resistance is encountered from the hydraulic fluid moving through the metering orifice 30 in diaphragm 32. By thus intercommunicating chambers 38 and 50, the resistance to strut stroking is changed from the characteristics indicated in full line, FIGURE 5, to that indicated by the dashed line, FIGURE 5.

The net result is lower resistance to strut shrinkage which permits lighter and smaller retracting mechanism and shrink linkage. Also, when the strut is fully telescoped, excessive pressures are not stored in the strut tending to elongate the strut.

(3) *Strut lowering.*—Prior to landing, the strut is lowered by reverse operation of the retracting mechanism. The retracting mechanism causes the landing gear assembly to pivot counterclockwise on trunnion 16 thus swinging it downwardly from the wheel well. The pneumatic pressure in chambers 38 and 48 causes the strut to elongate so that the strut is in a fully extended position at the time it is completely lowered.

The pressure in chambers 38 and 50 is superatmospheric, while the pressure in chamber 48 is atmospheric since it has been vented to atmosphere by the valve port 100. The pressure in chamber 38, acting over an effective area determined by the outer diameters of O ring seals 34 in diaphragm 32, tends to extend tubular member 26. Extension of the tubular member is opposed by the pressure in chamber 50 acting over an annular area defined by the diameters of O ring seals 44 and 46 and piston 42. This latter area, however, being less than the area defined by O rings 34, permits a net force sufficient to fully extend the strut. As the strut is lowered, extension of the strut is not obstructed by the shrink link since the piston 25 tends to move oppositely from its movement during strut shrinkage owing to the pressure which is stored in the cylinder 18. Also, aiding in extension of the strut, is the weight of the wheel and the tubular member 22.

When the strut is fully lowered (and extended), the enlarged head or nose of the metering pin 28 is in or just below the metering orifice 30.

(4) *Aircraft landing.*—When the aircraft initially touches down, the weight of the aircraft is transferred in part from the wing to the ground engaging wheel 14. The downward momentum of the aircraft creates an impact from engagement of wheel 14 with the ground, the impact being cushioned by strut operation. Chamber 36 is at this time filled with hydraulic fluid, and the resistance to strut shrinkage is determined almost entirely by the resistance offered by the oil moving through orifice 30, the effective cross sectional area of the orifice being determined by position of the metering pin during initial touch down. The enlarged end of the metering pin (at which touch down) constricts the metering orifice 30 to a considerable extent. Also, the resistance developed by the hydraulic fluid is directly proportional to the speed of telescoping movement of the tubular member 26. Thus, during initial touch down, the impact of landing is absorbed almost entirely by the hydraulic fluid passage across metering orifice 30.

As the strut continues to contract, hydraulic fluid leaves the exhausting chamber 36 and fills the chamber 38 compressing the pneumatic or gaseous fraction therein. During this period, of course, both the valves 56 and 72 are closed so that chamber 48 is not vented to atmosphere and chambers 38 and 50 are not connected.

Referring to FIGURE 5, where the pneumatic Pressure Stroke is indicated, there is shown in full line the pressure developed by the pneumatic cushioning medium (chambers 38, 48).

The pneumatic pressure developed in chamber 38 acts over an effective area determined by the diameters of O ring seals 34 to cushion the aircraft. Also, resisting strut contraction is the pressure developed in chamber 48 acting over an area determined by the diameters of O ring seals 44 and 46. Pressure in chamber 50 opposes the pressure in chamber 48. Hence, the pressures in chambers 48 and 50 are subtractive.

The strut continues to contract until the sinking speed diminishes to the point where the fluid no longer contributes any cushioning effect, and the weight of the aircraft is borne solely by the pneumatic pressure chambers 38 and 48. While the aircraft is taxiing, the strut has stroked typically, about nine and one-half inches and the pressure in the chambers is indicated on the curve at the point labeled normal taxiing position. Resistance to further strut contraction at this stage is determined almost solely by the pneumatic pressure which has now developed into considerable force.

If the retraction mechanism were to contract the strut into the wheel well without the assistance of the invention, it would be necessary to develop orders of pressure of this magnitude since there is a definite force for each strut position whether the position is determined from landing and/or taxiing conditions or imposed in the process of shrinking the strut to retract it within the well.

The usage of chamber 50 as a receiving chamber during strut shrinkage does not detract from the efficiency of the strut during landing. The resistance to strut stroking is affected only in the first one inch of strut stroking as is indicated by the straight line portion of the curve in FIGURE 5. The curve would ordinarily follow the dotted extension portion of the curve but is modified as indicated. However, the efficiency of the strut in this range of stroke, during the first inch of stroke, is determined almost entirely by the fluid medium and hence this modification does not impair the efficiency of the strut.

After the strut has stroked to four, five, six, seven inches or more, the pressure in chamber 50 (being a closed chamber) is expanded to such an extent that the pressure therein is only very slight and hence detracts only negligibly from the supportive effect provided by annular piston 42. As the result, the invention does not detract from the efficiency of the strut as a cushioning medium either during landing or taxiing. While the aircraft is on the ground, the pressure in chamber 48 can be increased by inflating it further from chamber 68 by suitable operation of the solenoid valve 90, and this will have the effect of simply moving the curve toward the left. This additional inflation of chamber 48 extends the strut, and gives it added stiffness, to increase its supportive capacity.

During taxiing, the supporting cushion of air pressure prevents "bottoming out" or contraction of the strut to the point that stop 74 engages abutment 76. If "bottoming out" should occur, then the strut is in effect a solid column and this provides a very hard uncushioned support for the aircraft which can damage the strut. As the curve indicates in FIGURE 5, the pneumatic pressure increases very sharply with strut stroking and at the end of the strut stroke the pressure builds up to the point where "bottoming out" is unlikely.

Referring next to the second embodiment of the invention, shown in FIGURE 6, parts corresponding to those previously described will receive the same reference numeral but also the subscript "a." In this instance, the chamber 38a and variable volume chamber 50a are interconnected by a conduit 60a which is external to the strut and not within the chamber 38 as indicated in FIGURE 2. Combined with the conduit 60a is a valve indicated generally by reference numeral 56a having an actuating switch 100 which actuates the valve to establish or interrupt communication between chamber 38a and variable volume chamber 50a. The valve 56a is operated during strut retraction to intercommunicate chambers 38a and 50a, thereby relieving pressure in 38a and reducing the resistance of the strut to shrinkage. In accomplishing this, the strut is in no way impaired in its efficiency as a cushioning means during aircraft landing and taxiing.

The conduit 60a is connected with the chamber 50a through a sealed elbow 102 which is matched with an opening 104 in the outer fixed tubular member 20a.

In all other structural and functional respects, the embodiment is substantially as described in the embodiment of FIGURE 2.

While it is desirable in many instances to provide a reservoir of air under pressure for inflation of the one variable volume chamber, it is not necessary to the invention. Thus in FIGURE 2, the reservoir 68 can be eliminated and the valve and lines connecting reservoir 68 with chamber 48 can be deleted without impairing the efficiency of the arrangement permitting ease of shrinkage of the strut during retraction.

It will be apparent to those skilled in the art that many revisions and variations of the invention are possible without departing from the underlying principles of the disclosed exampled embodiment. It is intended, therefore, that such revisions and variations are as reasonably expected on the part of those skilled in the art and which incorporate the herein disclosed principles will be included within the scope of the following claims.

I claim:

1. A shock strut comprising outer and inner concentrically positioned tubular members fixedly secured relative to each other and arranged to provide an annular spacing therebetween, supporting means connected to said outer tubular member to pivotably support said outer tubular member about one end, a transverse diaphragm secured to the end of said inner tubular member with a metering orifice formed therein, a reciprocable tubular member mounted between said inner and outer tubular members and slidably movable relatively thereto along the length thereof, a piston carried at one end of said reciprocable tubular member and sealingly engageable with said inner and outer tubular members to divide the annular space therebetween into first and second variable volume chambers, sealing means carried by said transverse diaphragm is slidable engagement with said reciprocable tubular member, a fluid connection communicating interiorly with said inner tubular member, a conduit connecting with said fluid connection and extending within said inner tubular member, an apertured partition secured to said conduit, a passageway through said partition and terminating in said second variable volume chamber, said second variable volume chamber being expanded during strut contraction to relieve the pressure in the interior of said inner tubular member, and controllable valve means operative with said fluid connection to control the transmission of fluid therethrough.

2. A shock strut comprising inner and outer concentric relatively fixed tubular members, said inner tubular member having a diaphragm with a metering orifice therein, the space defined by said inner fixed tubular member being an enclosed chamber having compressible medium therein, a reciprocable tubular member received between said inner and outer concentric tubular members, means carried at one end of said reciprocable tubular member to divide the annular space between said concentric tubular members into two variable volume chambers, an outlet passage from said enclosed chamber, a conduit connecting with said passageway and extending within said enclosed chamber, means connecting said conduit with one of the variable volume chambers, and controllable valve means connected to said outlet passage operative to establish or interrupt communication between said one of the variable volume chambers and the enclosed chamber.

3. A strut comprising two concentric relatively fixed tubular members, the inner of said tubular members defining an enclosed chamber having a compressible fluid therein, a reciprocable tubular member slidable between said concentric tubular members and dividing the annular space therebetween into two variable volume chambers, means interconnecting the enclosed chamber at the interior of said inner concentric tubular member and the one variable volume chamber which expands during strut contraction, a valve for controlling said interconnecting means so that communication is established to relieve pressure at the interior of said inner concentric tubular member thereby reducing the shrinkage resistance of the strut, a chargeable reservoir of pneumatic pressure within said strut which is normally closed, means communicating said reservoir with the variable volume chamber which expands during strut extension to produce inflation thereof, means for selectively controlling communication between said reservoir and variable volume chamber so that the strut can be stiffened against contraction, means for venting said inflatable variable volume chamber, and means sealingly separating said variable volume chambers.

4. A shock strut comprising two concentric relatively fixed tubular members, the interior of said inner tubular members containing a compressible fluid, a third tubular member which is slidable relatively to said fixed tubular members, an enclosed annular space defined between said fixed tubular members, means combined with said reciprocable tubular member to compress the fluid in the interior of said inner fixed tubular member during strut contraction to provide a resilient cushion, an outlet passage from the interior of said inner fixed tubular member, a conduit extended within said inner concentric tubular member and connecting with said outlet passage, an outlet from said conduit to the enclosed annular space between said fixed tubular members, and valve means for controlling communication between the interior of said inner fixed tubular member and said enclosed space for relieving pressure in said interior and thereby reducing resistance to strut shrinkage during retraction thereof.

5. A strut according to claim 4, including a piston combined with said reciprocable tubular member, two variable volume chambers formed in said enclosed annular space and divided by said piston, the variable volume chamber which is expandable during strut contraction being the portion of said enclosed annular space communicable with the interior of said inner fixed tubular member.

6. A strut according to claim 5 including, a pneumatic reservoir which is chargeable with pressure, interconnecting means from said reservoir to the variable volume chamber expandable during strut extension to inflate said variable volume chamber to increase the stiffness of the strut, and means for venting said inflatable variable volume chamber to the atmosphere.

References Cited in the file of this patent

UNITED STATES PATENTS

| | | |
|---|---|---|
| 2,213,823 | Renfer | Sept. 3, 1940 |
| 2,492,765 | Porath | Dec. 27, 1949 |
| 2,563,518 | Dickerman | Aug. 7, 1951 |
| 2,754,072 | Shapiro | July 10, 1956 |
| 2,892,626 | Scott et al. | June 30, 1959 |

FOREIGN PATENTS

| | | |
|---|---|---|
| 687,903 | Great Britain | Feb. 25, 1953 |